United States Patent [19]
Ing et al.

[11] Patent Number: 6,085,869
[45] Date of Patent: Jul. 11, 2000

[54] COMBINED OIL AND GREASE SYSTEM

[75] Inventors: Ronald Ing, Etobicoke; Andrew Kiedyk, Barrie; Keith Bowness, Alliston; Frank Goetz, Cambridge, all of Canada

[73] Assignee: Husky Injection Molding Systems Ltd., Canada

[21] Appl. No.: 09/168,393

[22] Filed: Oct. 6, 1998

[51] Int. Cl.[7] .............................. F01M 1/00; F16N 7/26; F16N 7/30
[52] U.S. Cl. .............................. 184/6; 184/55.1; 184/11.1
[58] Field of Search .............................. 184/55.1, 57, 29, 184/32, 40, 42, 11.1, 11.2, 58, 6

[56] References Cited

U.S. PATENT DOCUMENTS

| | | |
|---|---|---|
| 2,567,147 | 9/1951 | Cousino . |
| 3,831,381 | 8/1974 | Swearingen .................................. 184/6 |
| 3,876,037 | 4/1975 | Rath, Jr. .................................. 184/6.4 |
| 4,520,902 | 6/1985 | Snow .................................. 184/6.4 X |
| 5,575,354 | 11/1996 | Taylor .................................. 184/7.4 |

FOREIGN PATENT DOCUMENTS 0831181  3/1998  European Pat. Off. .

*Primary Examiner*—David A. Bucci
*Assistant Examiner*—Colby Hansen
*Attorney, Agent, or Firm*—Bachman & LaPointe, P.C.

[57] ABSTRACT

The present invention relates to a modular combined grease oil system for lubricating moveable parts of a machine and for recovering oil for reuse. The system includes a lubrication unit for automatically applying a lubricant such as a grease to various points on a machine, such as the clamping unit of an injection molding machine, after a predetermined number of operation cycles. The system further includes an oil recovery unit for retrieving oil from at least one hydraulic unit to prevent leakage, for collecting the retrieved oil, for removing contaminants from the collected oil, and for transferring the oil to a storage tank for reuse. A method of operation of the system is also described.

43 Claims, 3 Drawing Sheets

COMBINED OIL AND GREASE SYSTEM

BACKGROUND OF THE INVENTION

The present invention relates to a modular system and a method for lubricating moving components of a machine and for recovering hydraulic oil for reuse. The system and method of the present invention have particular utility in injection molding machines.

The lubrication of moving components on machinery by an automatic grease feeding system is well known in the art. Typically, these automatic greasing systems use compressed air to deliver grease through a network of piping to vital points on machinery for lubrication.

U.S. Pat. No. 2,567,147 to Cousino shows a lubricating mechanism for an injection molding machine. The lubricating mechanism is intended to add lubricant directly to the melted plastic stream to ease mold filling. This patent however lacks any disclosure of how one would lubricate the moving parts of the injection molding machine or recover hydraulic oil for recycling.

Hydraulic cylinders used in machines to operate various components typically weep hydraulic oil as they operate. As their seals wear, they tend to leak oil. Recovering this oil for reuse in the same machine is cost effective and prevents oil leakage onto the floor where it can create hazardous situations. Generally, any recovered oil must be filtered and freed from contaminants before it can be reused. Recovery of such oil typically has been performed by using drip trays beneath leaking components and a gravity drainage system to convey the oil to a sump or tank in the base of the machine. In these systems, the sump or tank must be periodically drained manually and the oil disposed of.

European Patent Application 0 831 181 to Shimada discloses a hydraulic circuit in which the internal leakage of a recycle selector valve is prevented. The hydraulic circuit includes a recycle valve attached directly to a control valve. When working fluid is returned from a rod chamber of an arm cylinder into the control valve, the recycle valve recycles a part of the working fluid through a recycle selector valve to a hydraulic supplying end. A pilot operated check valve is disposed in the oil channel that connects the rod chamber and the recycle selector valve together. When extending an arm cylinder of a hydraulic shovel, pilot pressure from the control valve shifts a pilot selector valve in such a direction as to open the pilot operated check valve. When the control valve is at the neutral position, the pilot selector valve is shifted back to the return position and closes the pilot operated check valve so that return oil of the arm cylinder is prevented from working on the recycle selector valve. This patent however does not address the problem of recovering hydraulic oil from external leakage, which oil is recovered for recycling.

A prior injection molding system developed by the assignee of the instant application collected waste oil, but lacked any means for automatically returning that oil to the main hydraulic tank for continued use. The system required someone to periodically empty the reservoir where the oil was collected. Thus, this system was not a "hands off operation" for the machine operator.

In conclusion, there is no known, commercially available system for an injection molding machine which deals with the recovery of leakage oil from hydraulic cylinders, the return of that oil to the main hydraulic tank via any route, and/or the combining of such functionality with any other system including a lubricant application system.

SUMMARY OF THE INVENTION

Accordingly, it is an object of the present invention to provide a system for lubricating movable parts of a machine and/or for recovering oil for reuse, which system has applicability to a wide range of machines.

It is a further object of the present invention to provide a system as above which is modular in nature and may be easily installed.

It is yet a further object of the present invention to provide an improved automatic or maintenance free method for lubricating machine components and recovering leakage oil for reuse.

It has been found that the system and method of the present invention achieve the foregoing objects.

In accordance with the present invention, a modular system for lubricating movable parts of a machine and for recovering oil for reuse comprises means for applying lubricant to portions of the machine, means for periodically automatically actuating said lubricant applying means, and means for automatically recovering leakage oil from at least one oil actuated device. In a preferred construction of the present invention, the oil recovery means comprises means for recovering leakage oil from a plurality of hydraulic units throughout the machine and includes means for storing recovered oil for reuse and means for removing contaminants from the recovered oil prior to it being stored in the storing means.

A method for automatically lubricating movable parts of a machine and for recovering oil for reuse comprises the steps of: providing means for applying a lubricant to portions of the machine; actuating the lubricant applying means after a predetermined number of operation cycles of said machine to apply lubricant to various points on the machine; retrieving oil from at least one hydraulic unit so as to prevent leakage; collecting the retrieved oil; and storing the collected oil in a storage tank for reuse.

Other details of the system and the method of the present invention, as well as other objects and advantages attendant thereto, are set forth in the following description and the accompanying drawings wherein like reference numerals depict like elements.

DETAILED DESCRIPTION OF THE PREFERRED EMBODIMENT(S)

Figure 1:
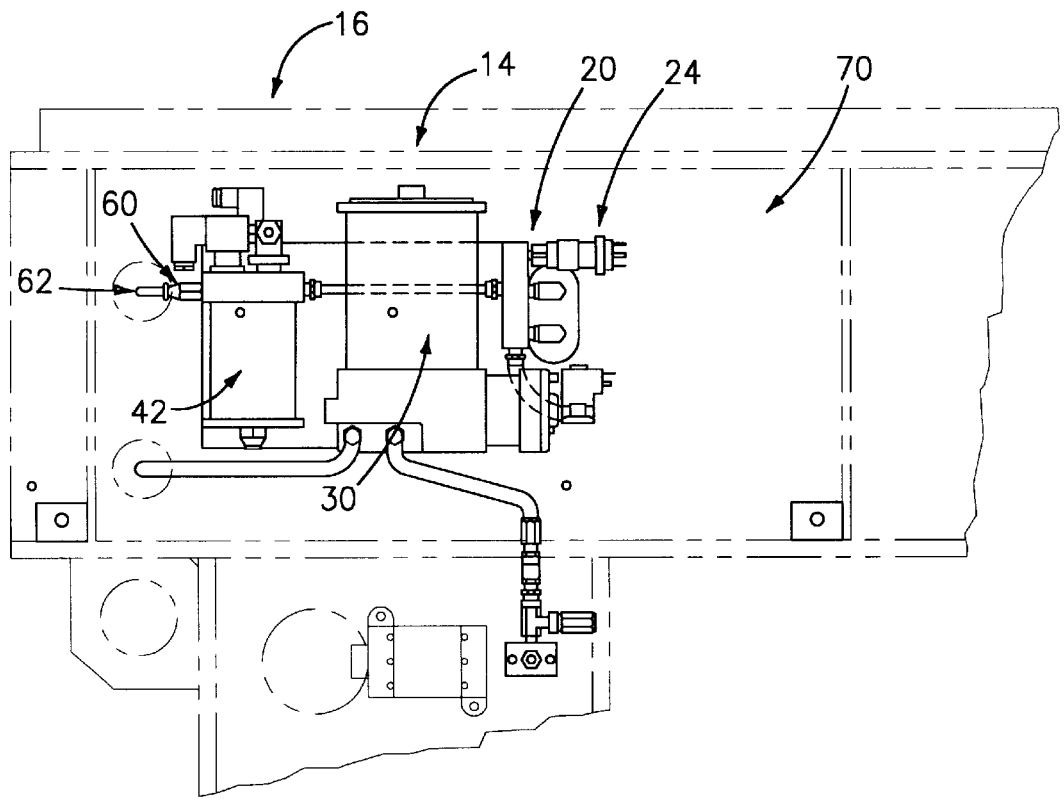
FIG. 1 illustrates a side view of the modular greasing and oil recovery system of the present invention mounted to a machine.

Referring now to the drawings, a modular system 10 for automatically lubricating movable parts of a machine and for recovering leakage oil for reuse is shown therein. While the system and the method of the present invention will be described in the context of a system and a method used in conjunction with an injection molding machine, it should be recognized that said system and method have broad applicability to other types of machines such as presses or heavy construction equipment.

The system 10 in the form shown in the drawings is a "bolt-on, plug and play" assembly requiring minimal additional assembly other than attaching it to a machine such as an injection molding machine 12 (not shown). The system 10 includes a lubrication unit 14 for applying a lubricant, such as grease, to various moving components or points on the machine 12, such as the components of a clamp unit (not shown) of an injection molding machine, and an oil recovery unit 16 which draws leakage oil from various hydraulic cylinder units 18 or the like throughout the machine 12 and recycles it for further use.

Figure 3:
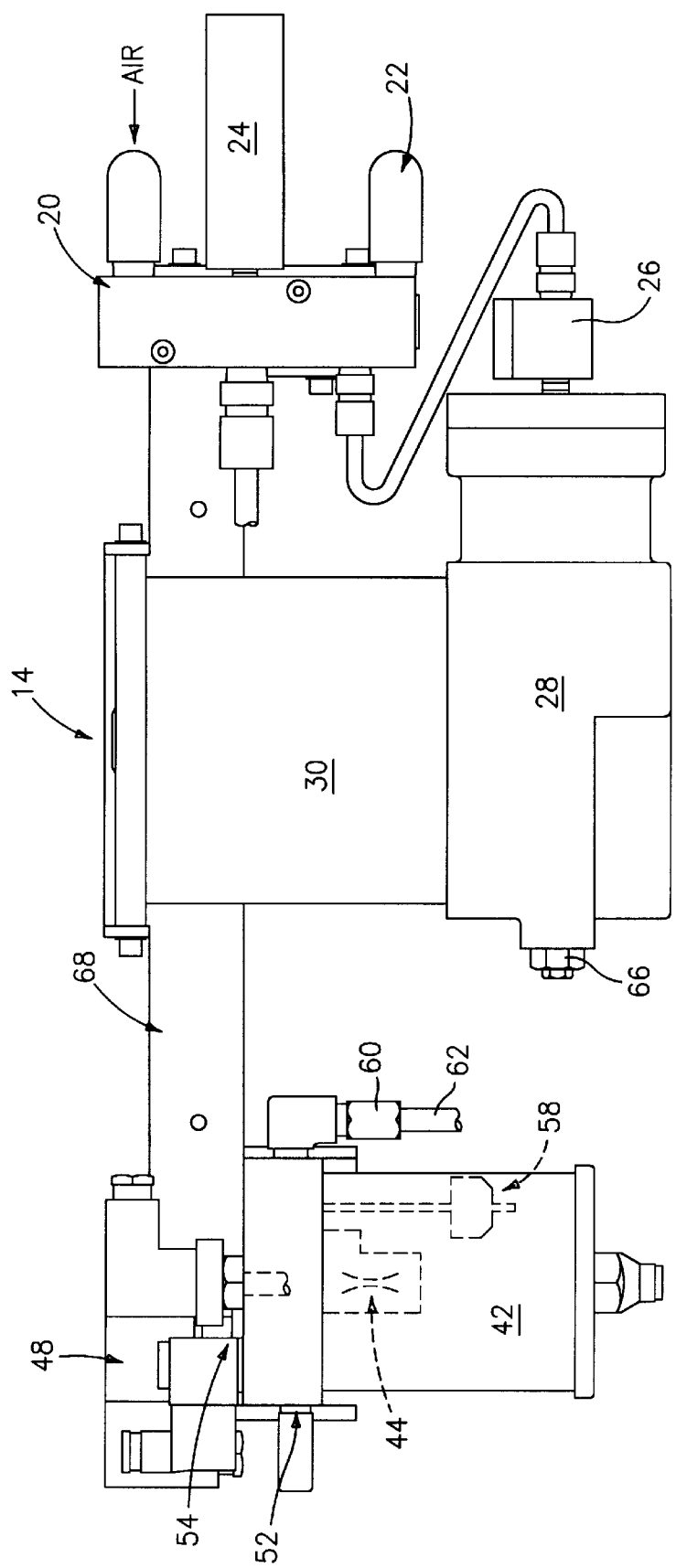
FIG. 3 is a side view of the modular system of the present invention.
Figure 4:
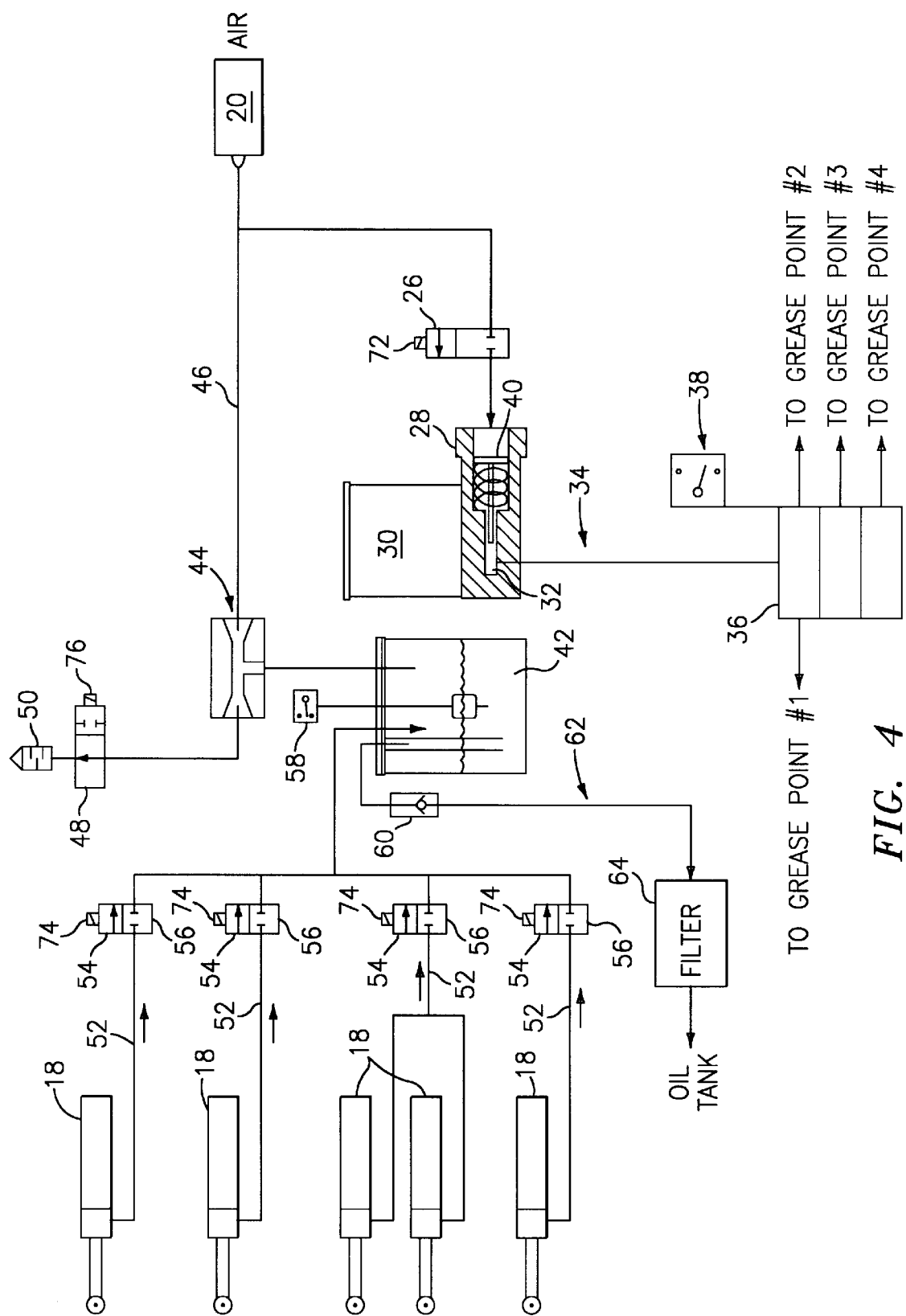
FIG. 4 is a schematic representation of the system of the present invention.

As shown in FIG. 4, both the lubrication unit 14 and the oil recovery system 16 are serviced by a common supply air manifold 20. The manifold 20 may have auxiliary or expansion ports such as secondary outlet 22 (see FIG. 3) for unrelated services (not shown) connected in series. A pressure switch 24 is provided to control the pressure of the air being supplied by the manifold 20. The manifold 20 preferably supplies air at a pressure in the range of from about 90 to about 150 psi. The manifold 20 may be connected to any suitable source (not shown) of air.

As shown in FIG. 4, the manifold 20 supplies air to a grease pump air inlet solenoid 26 which is used to operate a pump 28 for dispensing lubricant, such as grease, held in a reservoir 30. The outlet port 32 of the pump 28 is connected by a line 34 to a device 36, such as a divider block, for distributing the lubricant to various moving components or points on the machine 12. The lubrication unit 14 further includes an electric limit/cycle switch 38 mounted downstream of the dispensing pump 28 whose purpose will be described hereinafter. The limit switch 38 may be manipulated by use of a cycle pin (not shown) either by being in direct contact (pushing the switch) or indirectly by being in proximity (e.g. proximity sensor, optical sensor, etc.).

During normal operation of the machine 12, various cycles, such as the clamp cycles, are counted either automatically or by an operator. Once a preset number of cycles has been achieved, the solenoid 26 is energized to allow air to flow to the inlet of pump 28 and act on a pump piston 40. This causes one stroke of the piston 40 in the pump 28. By controlling the air being supplied by the manifold 20, the piston 40 may be moved forward slowly. The lubricant is then pushed through the line 34 and into the distribution device (manifold) 36 where it is divided to feed the individual lubrication points (not shown). Once the distribution device 36 has received a predetermined supply of lubricant, it changes the signal through the limit switch 38 via the cycle pin. This change causes a signal to be sent to a control station (not shown) on the machine 12 or to an operator, which signal indicates that a specific volume of grease has been delivered to the lubrication points and causes de-energization of the solenoid 26. If desired, the de-energization signal may be transmitted directly from the limit switch 38 to the solenoid 26.

This approach allows a fast return of the pump piston 40 premature of a full stroke (approximately 1 cubic centimeter). In comparison, in a typical grease application system, if allowed to complete one full stroke, a grease pump similar to the one shown in FIG. 4 would deliver 6 cubic centimeters of a grease lubricant over a period of approximately 9 minutes. A second stroke of the pump piston 40 can be made if needed to accommodate large compressible air pockets within the lubricant or if the initial stroke of the pump piston 40 does not provide an adequate amount of lubricant to the distribution device 36. It should be noted that the operation of the lubrication unit of the present invention differs from other lubrication pumps which control the volume pumped by increments of the number of pump strokes times the volume of one pump stroke. In the system of the present invention, complete control of the volume of lubricant pumped is transferred to the distribution device (manifold) 36.

The oil recovery unit 16 includes a reservoir 42 for receiving oil drained from the hydraulic cylinder units 18 to prevent leakage. A vacuum generator 44, such as a venturi vacuum generator, is provided to create at least a partial vacuum within the reservoir 42. As shown in FIG. 4, the air manifold 20 is connected to the vacuum generator 44 via line 46. In normal operation, the supply air from the manifold 20 is continually passed through the vacuum generator 44 so as to force a vacuum within the reservoir 42. The exhaust air passes through the vacuum generator 44 and through a normally open solenoid 48 called the blow-down solenoid. The air then exhausts to the atmosphere via muffler 50.

Further as shown in FIG. 4, a series of drain lines 52 run from leak points such as a cylinder packing area of hydraulic cylinder units 18 or any other potential hydraulic leak point throughout the machine 12. Each drain line 52 communicates with at least one hydraulic cylinder unit 18 at a first end and to the reservoir 42 at a second end. Further, each drain line 52 has a normally closed solenoid 54. When one of the solenoids 54 is energized, either mechanically or electronically, the valve 56 associated with the solenoid 54 opens and thus exposes the drain line 52 to the vacuum within the reservoir 42. This pulls any leakage oil away from the hydraulic cylinder unit 18 or the like, through the drain line 52 and into the reservoir 42 at a rate which is controlled by the vacuum within the reservoir 42. In a preferred mode of operation, each solenoid 54 is individually energized for a preset time in a sequential circuit, thus sequentially draining oil from the leak points.

The reservoir 42 is equipped with a level switch 58 which detects both high oil level and low oil level. The level switch 58 may be an electronic switch, a magnetic switch, or a manual switch. When high oil level is detected in the reservoir 42, a signal may be sent to a controller (not shown) to interrupt the sequential operation of the drain circuit formed by the drain lines 52 and energize the blow-down solenoid 48. The signal may be sent to the controller in any desired manner. Alternatively, the signal can be sent directly to the solenoid 54 in each drain line 52 and to the solenoid 48. When the blow-down solenoid 48 is energized, the vacuum generator exhaust flow is blocked. The supply air flowing through the generator 44 is then redirected so as to pressurize the reservoir 42. This pressurization forces the collected oil out of the reservoir 42, through an oil return check valve 60 and an oil return line 62 which is connected to an oil storage tank 63. The check valve 60 prevents back-flow and preserves the vacuum during drain cycles when the reservoir 42 is being filled. In a preferred mode of operation, the oil in the return line 62 passes through a filter 64 before reaching the storage tank. In this way, contaminants and other materials may be removed from the recovered oil to enable its reuse in the machine 12. The filter 64 may comprise any suitable filtration device or system known in the art.

If pressurized air entered the oil return line 62, it would tend to induce air entrainment in the oil storage tank. To prevent this, blow-down is stopped prior to completely emptying the reservoir. This is done by the switch 58 detecting a low level in the reservoir 42 and causing a signal to be sent to the blow-down solenoid 48 to de-energize it. The de-energization signal may be transmitted to a controller or an operator which then sends a de-energization signal to the blow-down solenoid 48. Alternatively, the low level signal may be transmitted directly to the solenoid 48. Once blow-down is stopped, a vacuum is once again created in the reservoir 42 and the drain operation may resume.

In the present system, the returned oil can enter a main hydraulic storage tank at almost any point, but ideally should be as far from the storage tank's inlet(s) as to any pumps.

While the oil and grease system of the present invention is designed to be automatic, there may be times when manual operation is required. To this end, the pump 28 for supplying lubricant can be manually operated by depressing and holding a manual override button 72 on the solenoid 26. Occasionally, air can be introduced into the reservoir 30 associated with the pump 28 through improper filling techniques or a faulty refill pump. The pump should pass most air pockets without causing an auto-lube fault. However, if a large pocket of air exists, it can be bled by loosening a bleed screw 66 (see FIG. 3) located near the lubricant outlet port 32. After the screw 66 has been loosened, the pump 28 can be energized as many times as necessary until lubricant extrudes from the bleed screw. Thereafter, the bleed screw 66 can be retightened.

If desired, each of the solenoids 54 in the drain lines 52 may be provided with a manual over-ride button 74, preferably located on the reservoir top plate directly above the drain line 52. By depressing the button 74 for a desired period of time, the line 52 may be exposed to the vacuum in the reservoir 42 and drained.

Similarly, the blow-down solenoid 48 can be provided with a manual over-ride button 76 to allow manual operation of it.

Figure 2:
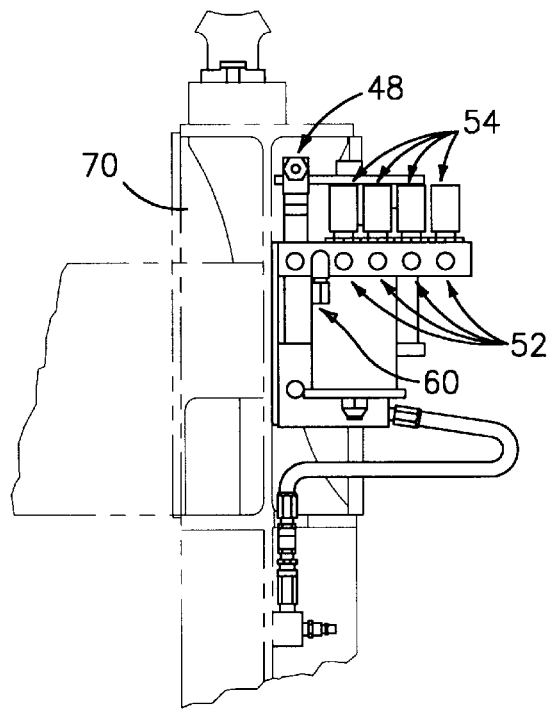
FIG. 2 illustrates an end view of the system of FIG. 1.

As shown in FIG. 3, the system of the present invention is modular in nature. The lubrication unit 14 and the oil recovery unit 16 are preferably connected to a common mounting bracket 68 which allows the two units to be affixed to a portion of the machine 12 via a bolt or screw (not shown). For example, the system 10 of the present invention may be connected the base 70 of a clamping unit on an injection molding machine as shown in FIGS. 1 and 2. Any suitable means known in the art may be used to connect the lubrication unit 14 and the oil recovery unit 16 to the bracket 68.

For machines which do not require lubrication, the lubrication unit 14 may be omitted from the system 10 if so desired.

While the pump 28 for supplying lubricant has been described as being an air pump, it is possible to use an electric pump instead of the air operated pump.

One of the advantages of the system of the present invention is that it is rugged enough to work with any type of oil and with almost any size/concentration of contaminant. Yet another advantage of the system of the present invention is that it is easy to install on a machine. Still further, it can be modified to apply lubricant to any number of moving components on the machine and to recover oil from any number of hydraulic units or the like. One of the principal advantages of the system of the present invention is that both lubrication and oil recovery can take place without any manual intervention. It has been found that yet another advantage to the present invention is that lubrication can be carried out using volumes of lubricant less than those required by other automatic greasing systems.

It is apparent that there has been provided in accordance with this invention a combined grease-oil system which fully satisfies, the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A system for lubricating movable parts of a machine and for recovering oil for reuse which comprises:
   a lubrication unit having means for applying a lubricant to portions of said machine and means for periodically automatically actuating said lubricant applying means; and
   an oil recovery unit distinct from said lubrication unit, said oil recovery unit having means for automatically recovering oil from at least one oil actuated device, said oil not being said lubricant.

2. The system according to claim 1, wherein said means for recovering oil comprises means for recovering leakage oil from a plurality of hydraulic units throughout the machine.

3. The system according to claim 1, further comprising means for storing recovered oil for reuse and means for removing contaminants from said recovered oil prior to it being stored in said storing means.

4. The system according to claim 1, wherein said lubricant applying means comprises an actuator and pump means connected to said actuator for creating a flow of lubricant to at least one desired location.

5. The system according to claim 4, wherein said lubricant applying means further comprises said pump means having an outlet port and means associated with said outlet port for receiving said lubricant from said pump means and for distributing said lubricant to a plurality of locations on said machine.

6. The system according to claim 5, further comprising means for de-energizing said actuator when a predetermined volume of lubricant has been received by said distributing means from said pump means.

7. The system according to claim 4, further comprising means for energizing said actuator after a predetermined number of operation cycles has been reached.

8. The system according to claim 7, further comprising:
   said actuator comprising an air inlet solenoid; and
   an air supply manifold for providing air under pressure to said pump means when said air inlet solenoid is energized.

9. The system according to claim 8, further comprising means for manually actuating said air inlet solenoid.

10. The system according to claim 8 wherein said leakage oil drawing means comprises at least one drain line connected to at least one of said components at one end and to said reservoir means at a second end and a normally closed valve means within said at least one drain line.

11. The system according to claim 10, wherein said oil recovering means further comprises means for creating a vacuum within said reservoir means and means for opening said normally closed valve means in said at least one drain line and-exposing said oil in said at least one drain line to said vacuum in said reservoir means, thereby causing said oil to flow into said reservoir means.

12. The system according to claim 11, wherein said opening means comprises a solenoid associated with said valve means which solenoid is periodically energized for a preset time.

13. The system according to claim 11, further comprising a plurality of drain lines, each of said drain lines communicating with at least one hydraulic unit at one end and said reservoir means at a second end and having valve means and a solenoid for opening said valve means, and means for individually and sequentially operating each of said solenoids so as to sequentially open said valve means and thereby sequentially drain leakage oil from said drain lines.

14. The system according to claim 13, further comprising each of said solenoids for opening said valve means having a button for manual operation thereof.

15. The system according to claim 4, further comprising means for bleeding air from said pump means.

16. The system according to claim 1, wherein said oil recovering means comprises means for drawing leakage oil from components on said machine and reservoir means for collecting said oil.

17. The system according to claim 1, further comprising a manifold for supplying air under pressure and said manifold communicating with both Said lubricant applying means and said oil recovery means.

18. The system according to claim 1, further comprising means for mounting said system to a machine and said lubricant applying means and said oil recovery means being connected to said mounting means so as to form a modular system.

19. A system system for lubricating movable parts of a machine and for recovering oil for reuse which comprises:
   means for applying a lubricant to portions of said machine;
   means for periodically automatically actuating said lubricant applying means;
   means for automatically recovering oil from at least one oil actuated device;
   wherein said lubricant applying means comprises an actuator and pump means connected to said actuator for creating a flow of lubricant to at least one desired location;
   means for energizing said actuator after a predetermined number of operation cycles has been reached;
   said actuator comprising an air inlet solenoid and an air supply manifold for providing air under pressure to said pump means when said air inlet solenoid is energized;
   said leakage oil drawing means comprising at least one drain line connected to at least one of said components at one end and to said reservoir means at a second end and a normally closed valve means within said at least one drain line;
   said oil receiving means further comprising means for creating a vacuum within said reservoir means and means for opening said normally closed valve means in said at least one drain line and exposing said oil in said at least one drain line to said vacuum in said reservoir means, thereby causing said oil to flow into said reservoir means; and
   a venturi vacuum generator, an air supply communicating with said venturi vacuum generator, and a blow-down solenoid associated with said venturi vacuum generator, said-blow-down solenoid normally being in an open position to exhaust air to the atmosphere.

20. The system according to claim 19 further comprising means for detecting the level of oil in said reservoir means, said detecting means causing a first signal to be transmitted to said opening means in said at least one drain line to interrupt the draining of said oil from said at least one drain line when a high level of oil is detected in said reservoir means and further causing a second signal to be transmitted to said blow-down solenoid when said oil level in said reservoir means is high for energizing said blow-down solenoid and thereby causing blocking of said exhaust air to the atmosphere and pressurization of said reservoir means.

21. The system according to claim 18, further comprising an oil return line for returning oil from said reservoir means to a storage tank for reuse.

22. The system according to claim 21, wherein said return line includes a check valve for preventing return of oil to said reservoir means via said return line and means for filtering said oil being returned to said storage tank.

23. The system according to claim 19, further comprising means for manually actuating said blow-down solenoid.

24. A system for automatically recovering oil from a plurality of leakage points on a machine, said system comprising:
   reservoir means for collecting said oil to be reused;
   a plurality of drain lines;
   each of said drain lines being connected at a first end to at least one unit which leaks oil and at a second end to said reservoir means;
   means for creating at least a partial vacuum within said reservoir means;
   means for exposing said oil in each of said drain lines to said vacuum in said reservoir means so as to cause a flow of oil towards said reservoir means;
   each of said drain lines having a valve which is normally closed and a solenoid for opening said valve; and
   means for sequentially and individually operating said solenoids in said drain lines so as to sequentially transmit oil from said drain lines to said reservoir means.

25. The system according to claim 24, further comprising means for mounting said oil recovery system to a machine.

26. A system for automatically recovering oil from a plurality of leakage points on a machine, said system comprising:
   reservoir means for collecting said oil to be reused;
   a plurality of drain lines;
   each of said drain lines being connected at a first end to at least one unit which leaks oil and at a second end to said reservoir means;
   means for creating at least a partial vacuum within said reservoir means;
   means for exposing said oil in each of said drain lines to said vacuum in said reservoir means so as to cause a flow of oil towards said reservoir means;
   each of said drain lines having a valve which is normally closed and a solenoid for opening said valve;
   means for sequentially and individually operating said solenoids in said drain lines so as to sequentially transmit oil from said drain lines to said reservoir means; and
   said vacuum creating means comprising a venturi vacuum generator, an air supply communicating with said venturi vacuum generator, and a blow-down solenoid associated with said venturi vacuum generator, said blow-down solenoid normally being in an open position to exhaust air to the atmosphere.

27. The system according to claim 26, further comprising a storage tank for collecting oil to be reused and a return line connected at one end to said reservoir means and at a second end to said storage tank.

28. The system according to claim 27, further comprising a check valve in said return line to prevent, any return of oil to said reservoir means and means for removing contaminants from said oil, said contaminant removing means being positioned in said return line between said check valve and said storage tank.

29. The system according to claim 27, further comprising means for detecting the level of oil in said reservoir means and for interrupting the draining of said oil from said drain lines when said oil level is high.

30. The system according to claim 29 further comprising said detecting means transmitting a signal to said blow-down solenoid to close said solenoid and thereby redirect air flow in said generator to said reservoir means so as to pressurize said reservoir means and cause a flow of oil from said reservoir means into said return line.

31. A method for automatically lubricating movable parts of a machine and for recovering oil for reuse comprising the steps of:

provviding a lubrication unit having means for applying a lubricant to portions of said machine;

actuating said lubricant applying means after a predetermined number of operation cycles of said machine so as to automatically apply lubricant to various points on the machine;

providing an oil recovery unit distinct from said lubrication unit;

retrieving oil not being said lubricant from at least one hydraulic unit using said distinct oil recovery unit so as to prevent leakage;

collecting said retrieved oil; and storing said collected oil in a storage tank for reuse.

32. The method according to claim 31, wherein said step of providing said lubricant applying means comprises providing a supply of lubricant in a lubricant storage tank, pump means for pumping lubricant from said lubricant storage tank, and a solenoid for actuating said pump means and wherein said actuating step comprises actuating said solenoid after said predetermined number of cycles so as to cause said pump means to distribute lubricant to at least one location.

33. The method according to claim 32, further comprising distributing said lubricant pumped by said pump means to a plurality of points on said machine.

34. The method according to claim 32, further comprising monitoring the volume of lubricant being distributed and de-energizing said solenoid when a predetermined volume of lubricant has been distributed.

35. The method according to claim 32, further comprising supplying air under pressure to said solenoid to actuate said pump means.

36. The method according to claim 31, wherein said steps of retrieving oil and collecting same comprises creating at least a partial vacuum in a reservoir means; providing a plurality of drain lines each connected at one end to at least one hydraulic unit and at a second end to said reservoir means; and sequentially and individually exposing said drain lines to said vacuum in said reservoir means to cause a flow of said oil from said drain lines to said reservoir means.

37. The method of claim 36, further comprising measuring the level of oil in said reservoir means and interrupting flow of said oil from said drain lines to said reservoir means when said oil level in said reservoir means is too high.

38. The method according to claim 35, further comprising removing contaminants from said collected oil prior to storing said oil in said storage tank.

39. A method for automatically lubricating movable parts of a machine and for recovering oil for reuse comprising the steps of:

providing means for applying a lubricant to portions of said machine;

actuating said lubricant applying means after a predetermined number of operation cycles of said machine so as to automatically apply lubricant to various points on the machine;

retrieving oil from at least one hydraulic unit so as to prevent leakage;

collecting said retrieved oil;

storing said collected oil in a storage tank for reuse;

said oil retrieving and collecting steps comprising creating at least a partial vacuum in a reservoir means;

providing a plurality of drain lines each connected at one end to at least one hydraulic unit and at a second end to said reservoir means;

sequentially and individually exposing said drain lines to said vacuum in said reservoir means to cause a flow of said oil from said drain lines to said reservoir means;

measuring the level of oil in said reservoir means and interrupting flow of said oil from said drain lines to said reservoir means when said oil level in said reservoir means is too high; and providing a return line between said reservoir means and said storage tank and pressurizing said reservoir means when said oil level is too high so as to cause a flow of said collected oil to said storage tank.

40. The method according to claim 39, further comprising remeasuring the level of said oil in said reservoir means and stopping flow of said oil to said storage tank when said oil level in said reservoir means is too low.

41. The method according to claim 40, wherein said flow stopping step comprises depressurizing said reservoir means and thereafter re-creating said vacuum in said reservoir means.

42. The method according to claim 41, further comprising re-establishing the flow of oil from said drain lines to said reservoir tanks subsequent to said stopping step.

43. A system for lubricating movable parts of a machine and for recovering oil for reuse which comprises:

a lubrication unit having means for applying a lubricant to portions of said machine and means for periodically automatically actuating said lubricant applying means;

an oil recovery unit distinct from said lubrication unit, said oil recovery unit having means for automatically recovering oil from at least one oil actuated device, said oil not being said lubricant; and a manifold for supplying an operating fluid under pressure to said lubrication unit and to said distinct oil recovery unit.

* * * * *

UNITED STATES PATENT AND TRADEMARK OFFICE
CERTIFICATE OF CORRECTION

PATENT NO. : 6,085,869
DATED : July 11, 2000
INVENTOR(S) : Ronald Ing et al.

It is certified that error appears in the above-identified patent and that said Letters Patent is hereby corrected as shown below:

Column 7,
Line 14, change "Said" to -- said --;
Line 53, change "said-blow" to -- said blow --;
Line 66, change "claim 18" to "claim 20";
Line 21, change "A system system for" to -- A system for --;

Column 8,
Line 58, change "prevent, any" to -- prevent any --;

Column 10,
Line 1, change "claim 35" to -- claim 31 --.

Signed and Sealed this

Seventh Day of August, 2001

*Attest:*

*Attesting Officer*

NICHOLAS P. GODICI
*Acting Director of the United States Patent and Trademark Office*